(12) United States Patent
Powell

(10) Patent No.: US 6,350,092 B1
(45) Date of Patent: Feb. 26, 2002

(54) DOWEL FASTENER AND METHOD FOR SECURELY ATTACHING ITEMS TO AN EDGE OF A COMPOSITE BOARD

(76) Inventor: Jonathan S. Powell, 5094 Tip Top Rd., Mariposa, CA (US) 95338

( * ) Notice: Subject to any disclaimer, the term of this patent is extended or adjusted under 35 U.S.C. 154(b) by 0 days.

(21) Appl. No.: 09/553,744

(22) Filed: Apr. 20, 2000

(51) Int. Cl.$^7$ .............................................. F16B 37/04
(52) U.S. Cl. ..................... 411/82; 411/172; 403/403; 403/382; 403/408.1; 312/263
(58) Field of Search .............................. 403/403, 382, 403/408.1; 312/263, 257.1; 411/82, 82.1, 82.2, 82.3, 172

(56) References Cited

U.S. PATENT DOCUMENTS

| | | |
|---|---|---|
| 1,619,836 A | 3/1927 | Tasman |
| 2,496,032 A | 1/1950 | Austin .......................... 287/54 |
| 3,572,511 A | 3/1971 | Triplett ..................... 211/105.6 |
| 3,695,655 A * | 10/1972 | Wippermann |
| 3,721,463 A | 3/1973 | Attwood et al. ........... 287/20.3 |
| 3,951,558 A * | 4/1976 | Komarov |
| 4,047,822 A | 9/1977 | Lehmann ..................... 403/187 |
| 4,360,282 A | 11/1982 | Koch ........................... 403/19 |
| 4,474,493 A | 10/1984 | Welch ......................... 403/405 |
| 4,518,278 A | 5/1985 | Koch ........................... 403/230 |
| 4,576,506 A | 3/1986 | Röck et al. .............. 403/407.1 |
| 4,615,636 A | 10/1986 | Tisbo et al. ..................... 403/8 |
| 4,923,321 A | 5/1990 | Kriz ............................... 403/6 |
| 4,981,388 A | 1/1991 | Becken et al. .............. 403/258 |
| 5,259,686 A | 11/1993 | Hatch .......................... 403/267 |
| 5,332,348 A | 7/1994 | Lemelson ................... 411/427 |
| 5,569,007 A * | 10/1996 | Abraham |
| 5,733,083 A * | 3/1998 | Heminger |
| 5,803,613 A | 9/1998 | Riedel et al. ................ 384/276 |

FOREIGN PATENT DOCUMENTS

AU 4736764 7/1964

* cited by examiner

Primary Examiner—Flemming Saether
(74) Attorney, Agent, or Firm—Richard C. Miller, P.C.

(57) ABSTRACT

A fastener for securely attaching a board perpendicularly to an edge of a composite board that includes a first portion and a second portion. The first portion includes a dowel that fixedly engages in a blindbore in the edge of the composite board, a washer that removably abuts against the dowel and the edge of the composite board and limits travel of the dowel in the blindbore, glue that is disposed on the dowel and in the blindbore and fixedly engages the dowel in the blindbore, and an installation screw that extends through the washer and threadably into the dowel, and when tightened, holds the first portion together as a unit, while the unit is being installed in the blindbore, and once the unit is installed, the installation screw and the washer are removed, with the glue maintaining the first portion in the blindbore. The outer longitudinal surface of the dowel is etched with 50% HCl to give a thin black coating to improve pullout strength of the dowel, as opposed to at least one of knurls, truncated threads, and roughening which would decrease the pullout strength of the dowel. The second portion includes a fastener screw that replaces the removed installation screw and extends through a countersunk-throughbore in the board and into the dowel, and when tightened, securely attaches the board perpendicularly to the edge of the composite board.

2 Claims, 6 Drawing Sheets

DOWEL FASTENER AND METHOD FOR SECURELY ATTACHING ITEMS TO AN EDGE OF A COMPOSITE BOARD

BACKGROUND OF THE INVENTION

1. Field of the Invention

The present invention relates to a fastener for attaching a board perpendicularly to an edge of a composite board. More particularly, the present invention relates to a fastener for securely attaching a board perpendicularly to an edge of a composite board.

2. Description of the Prior Art

A plywood sheet is a sandwich of thin sheets of wood bonded together and a composite board is flakes bonded together. It is difficult to strongly attach other materials to an edge of the plywood or composite board with fasteners, such as screws and nails, since they easily pull out.

There is no adequate way to attach an edge of a particle board perpendicular to the side of another board, as in a shelf. The edge of the shelf attached to a vertical member with such fasteners as screws and nails will not support an acceptable load without pulling out and/or causing the edge to split away with very little load on the shelf. This is why particle board furniture has such a poor reputation for strength.

A typical prior art example of attaching a board 10 perpendicularly to an edge 12 of a composite board 14 can best be seen in FIGS. 1 and 2, and as such, will be discussed with reference thereto.

The board 10 is provided with a countersunk-throughbore 16.

A flat head screw 18 is inserted freely into the countersunk-throughbore 16 and threadably engaged into the edge 12 of the composite board 14.

Numerous other innovations for joint fasteners have been provided in the prior art that will be described. Even though these innovations may be suitable for the specific individual purposes to which they address, however, they differ from the present invention.

A FIRST EXAMPLE, U.S. Pat. No. 4,047,822 to Lehmann teaches a fitting for detachably interconnecting two walls of an item of furniture at an angle to one another. The fitting comprises a bearing body locatable in one wall, which body has two bores formed therein, a rotatable torsion bolt being located in one bore and a portion of a tightening bolt in the other bore. On its external surface the torsion bolt is grooved. The two bores communicate with one another. In use, the head of the tightening bolt engages with the groove in the torsion bolt, and the opposed end of the tightening bolt engages in the other wall whereby rotation of the torsion bolt locks the tightening bolt in position and causes said walls to be interconnected.

A SECOND EXAMPLE, U.S. Pat. No. 4,360,282 to Koch teaches a connection fitting for detachably securing two vertically abutting bodies of furniture to be connected to each other in their respective regions of contact. One of the two furniture bodies has attached thereto a projecting fastener bolt having a fastening head. The other piece of furniture is provided with a generally cup-shaped enclosure or casing in a cavity to accommodate a rotatably mounted tensioning member. The head of the fastener bolt is in operative connection with the tensioning member and is adapted to be drawn into the casing when the tensioning member is rotated.

A THIRD EXAMPLE, U.S. Pat. No. 4,474,493 to Welch teaches a dowel fastener for frictionally engaging the sides of recesses, bores or apertures in wood, metal, and/or plastic joint members to hold the joint members together. The dowel has a flexible resilient, compressible tubular body with a spiral slot extending along its length. At least one end of the dowel is tapered and preferably includes inwardly angled, segmented, end flanges terminating in a circular, free end edge of smaller diameter than said body. The flanges lead the dowel into a reduced width or diameter recess or aperture upon assembly into a joint. The opposite end may also be tapered for insertion in a similar recess or include an apertured, planar end preferably formed from bent end flanges for securing the dowel to a surface with a screw or other fastener. Preferably, the diameter of the free end edge of the tapered end or ends is sized to prevent compressive insertion in an aperture or recess which is too small and would otherwise cause deformation or failure of the dowel.

A FOURTH EXAMPLE, U.S. Pat. No. 4,518,278 to Koch teaches a connecting device for detachable connection of two perpendicularly positioned panels, such as furniture panels, by means of a grooved fastener bolt fastened in the first panel and a tightening bolt rotatably mounted in a blind bore of the second panel. The tightening bolt is mounted in a first blind bore in the second panel and the fastener bolt is adapted to be inserted into a second blind bore in the second panel perpendicular to the first bore. The tightening bolt is in operative engagement with the head of the fastener bolt in such a manner that as the tightening bolt is rotated the fastener bolt is pulled into the second blind bore firmly joining the two panels.

A FIFTH EXAMPLE, U.S. Pat. No. 4,576,506 to Rock et al. teaches a joining device for connecting two furniture parts that includes a dowel casing which is insertable into a bore in the side face of one furniture part and a screw that is screwed into the front face of the other furniture part. The screw is held in the dowel casing by a holding member which is a clamping element. The dowel casing is made of one piece and is open at its bottom. The holding member has an annular rim by which it is held by lateral projections of the dowel casing.

A SIXTH EXAMPLE, U.S. Pat. No. 4,923,321 to Kriz teaches a fitting for releasably connecting two plate-shaped furniture parts meeting at a right angle that includes a bolt anchorable in a dowel casing in a furniture part and having a head acted upon by an eccentric bushing which is mounted without an axle in the other furniture part. The bolt is anchored in the dowel casing by a disc which is held in the dowel casing for displacement in a plane transverse or vertical to the bolt. The dowel casing has at a side thereof facing the other furniture part an opening which is of greater size than the diameter of the bolt.

A SEVENTH EXAMPLE, U.S. Pat. No. 5,259,686 to Hatch teaches a wooden dowel for insertion into aligned bores of two pieces of wood that are to be connected to each other. The dowel comprises a cylindrical piece of wood and a coasting of water soluble glue covering the external surfaces of the cylindrical piece of wood.

It is apparent that numerous innovations for joint fasteners have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a fastener for securely attaching a board perpendicularly to an edge of a composite board that avoids the disadvantages of the prior art.

ANOTHER OBJECT of the present invention is to provide a fastener for securely attaching a board perpendicularly to an edge of a composite board that is simple and inexpensive to manufacture.

STILL ANOTHER OBJECT of the present invention is to provide a fastener for securely attaching a board perpendicularly to an edge of a composite board that is simple to use.

BRIEFLY STATED, YET ANOTHER OBJECT of the present invention is to provide a fastener for securely attaching a board perpendicularly to an edge of a composite board that includes a first portion and a second portion. The first portion includes a dowel that fixedly engages in a blindbore in the edge of the composite board, a washer that removably abuts against the dowel and the edge of the composite board and limits travel of the dowel in the blindbore, glue that is disposed on the dowel and in the blindbore and fixedly engages the dowel in the blindbore, and an installation screw that extends through the washer and threadably into the dowel, and when tightened, holds the first portion together as a unit, while the unit is being installed in the blindbore, and once the unit is installed, the installation screw and the washer are removed, with the glue maintaining the first portion in the blindbore. The outer longitudinal surface of the dowel is etched with 50% HCl to give a thin black coating to improve pullout strength of the dowel, as opposed to at least one of knurls, truncated threads, and roughening which would decrease the pullout strength of the dowel. The second portion includes a fastener screw that replaces the removed installation screw and extends through a countersunk-throughbore in the board and into the dowel, and when tightened, securely attaches the board perpendicularly to the edge of the composite board.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING

Figure 1:
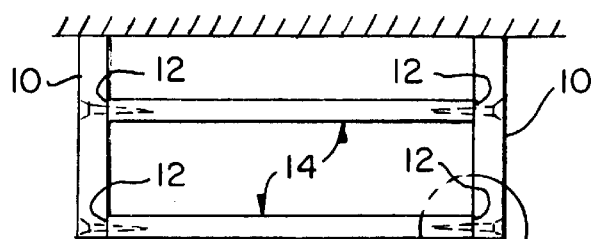
FIG. 1 is a diagrammatic top plan view of a prior art fastener attaching a board perpendicularly to an edge of a composite board.
Figure 2:
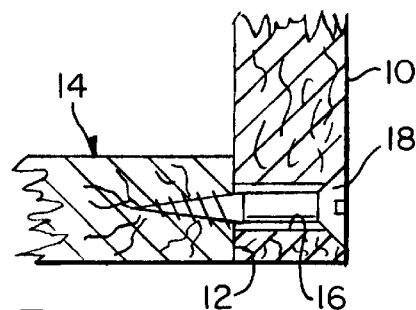
FIG. 2 is an enlarged diagrammatic cross section of the area generally enclosed by the dotted curve identified by arrow 2 in FIG. 1.

Prior Art 10 board
12 edge of composite board 14
14 composition board
16 countersunk-throughbore in board 10
18 flat head screw Preferred Embodiment 20 fastener of present invention for securely attaching board 10 perpendicularly to edge 12 of composite board 14
22 first portion for engaging in blindbore 23 in edge 12 of composite board 12
23 blindbore in edge 12 of composite board 12
24 second portion for extending in countersunk-throughbore 18 in board 10
26 dowel of first portion 22 for fixedly engaging in blind bore 23 in edge 12 of composite board 12
30 washer of first portion 22 for removably abutting against edge 12 of composite board 12 for limiting travel of dowel 26 of first portion 22 in blindbore 23 in edge 12 of composite board 14
32 installation screw of first portion 22
33 glue of first portion for fixedly engaging dowel 26 of first portion 22 in blindbore 23 in edge 12 of composite board 14
34 first end of dowel 26 of first portion 22 for fixedly engaging in blindbore 23 in edge 12 of composite board 14
36 second end of dowel 26 of first portion 22 for fixedly aligning with edge 12 of composite board 12
37 outer longitudinal surface 37 of dowel 26 of first portion 22 for fixedly engaging blindbore 23 in edge 12 of composite board 14
38 blindbore in dowel 26 of first portion 22
40 fastener screw of second portion 24

DETAILED DESCRIPTION OF THE PREFERRED EMBODIMENT

Figure 3:
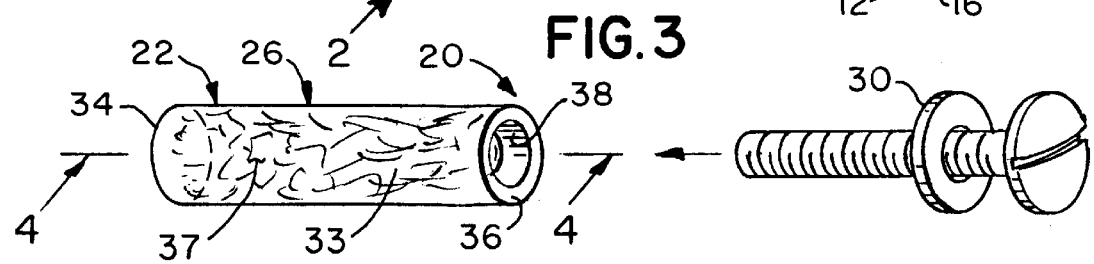
FIG. 3 is an exploded diagrammatic perspective view of the present invention.

Referring now to the figures, in which like numerals indicate like parts, and particularly to FIG. 3, the fastener of the present invention is shown generally at 20 for securely attaching a board 10 perpendicularly to an edge 12 of a composite board 14.

Figure 4:
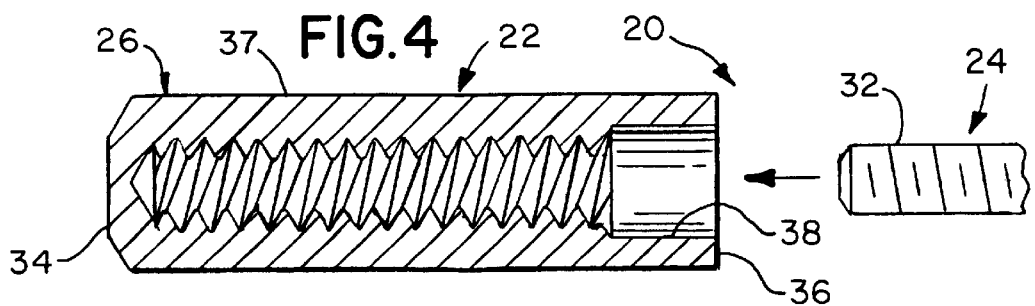
FIG. 4 is an enlarged diagrammatic cross sectional view taken on line 4—4 in FIG. 3.
Figure 5:
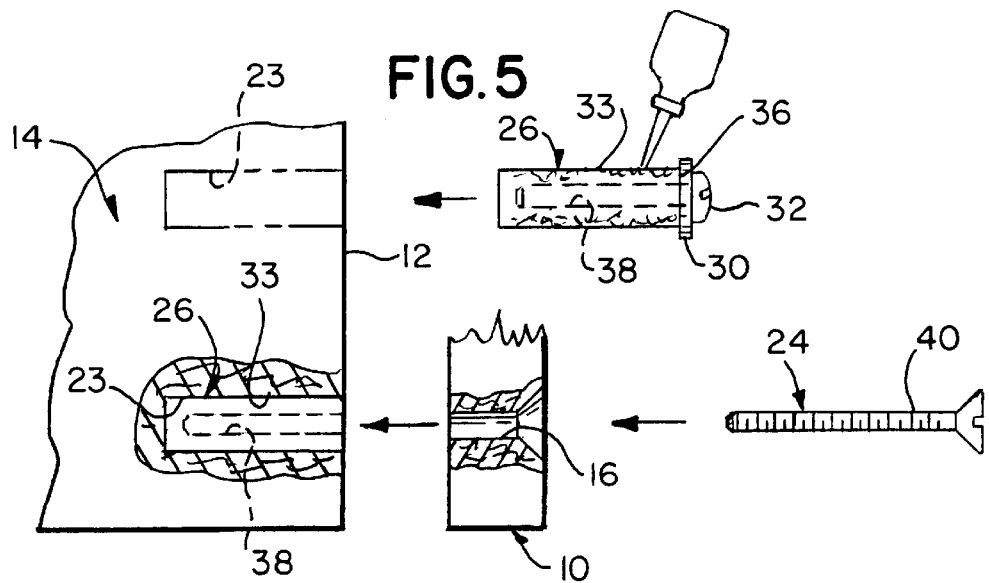
FIG. 5 is a diagrammatic side elevational view illustrating the method of using the present invention.
Figure 6A:
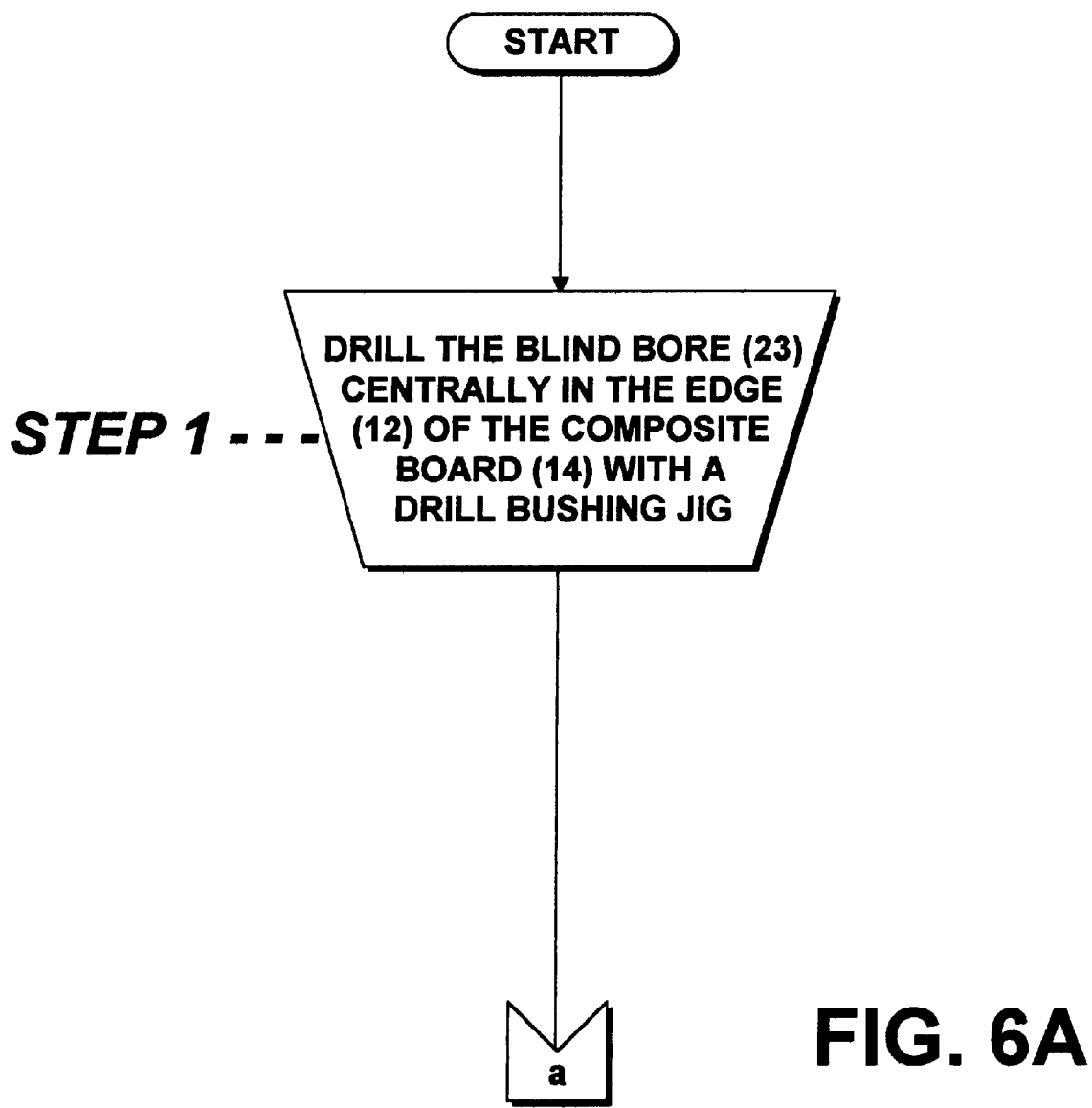
FIGS. 6A–6E are a block diagram of the method of using the present invention.
Figure 6B:
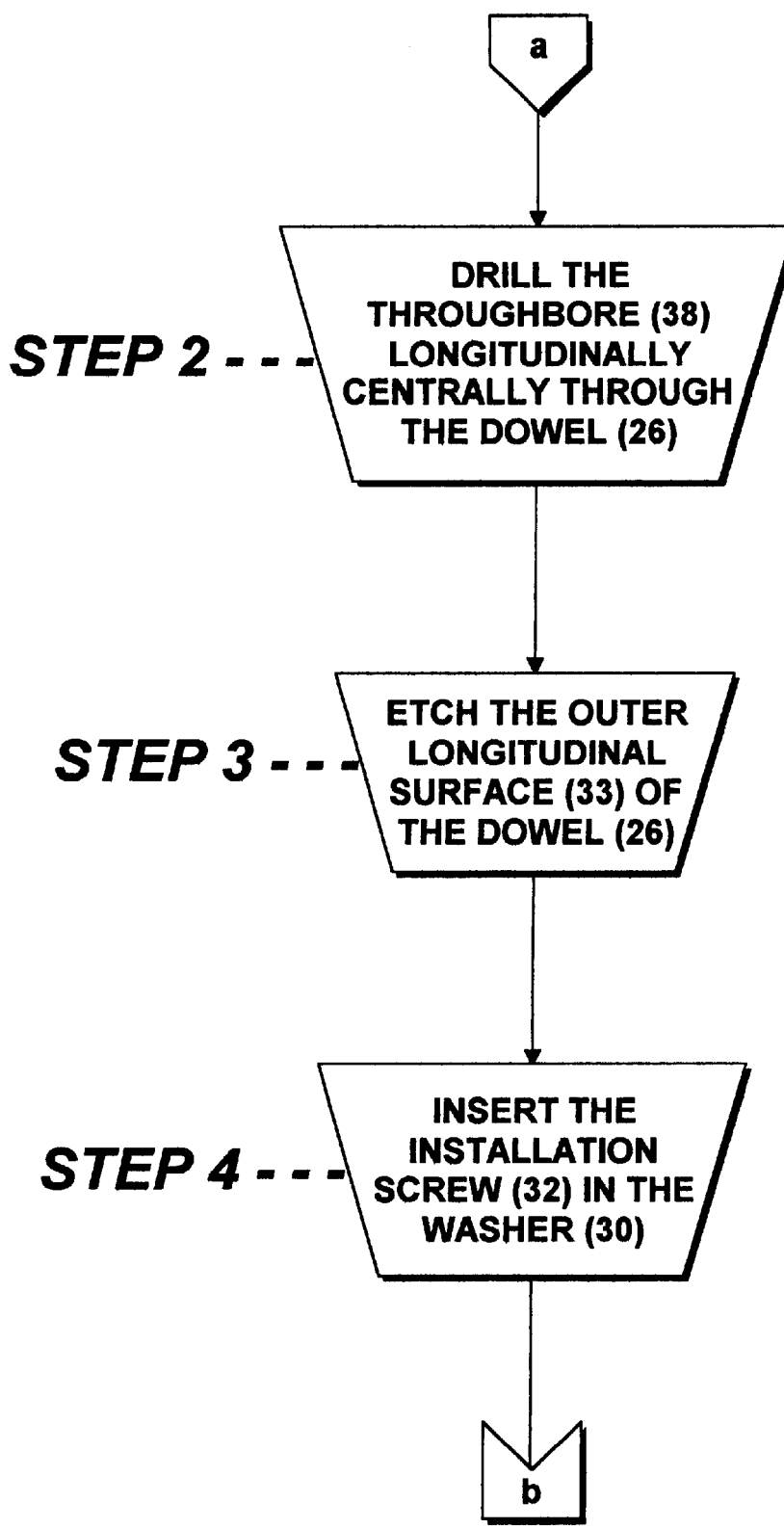
Figure 6C:
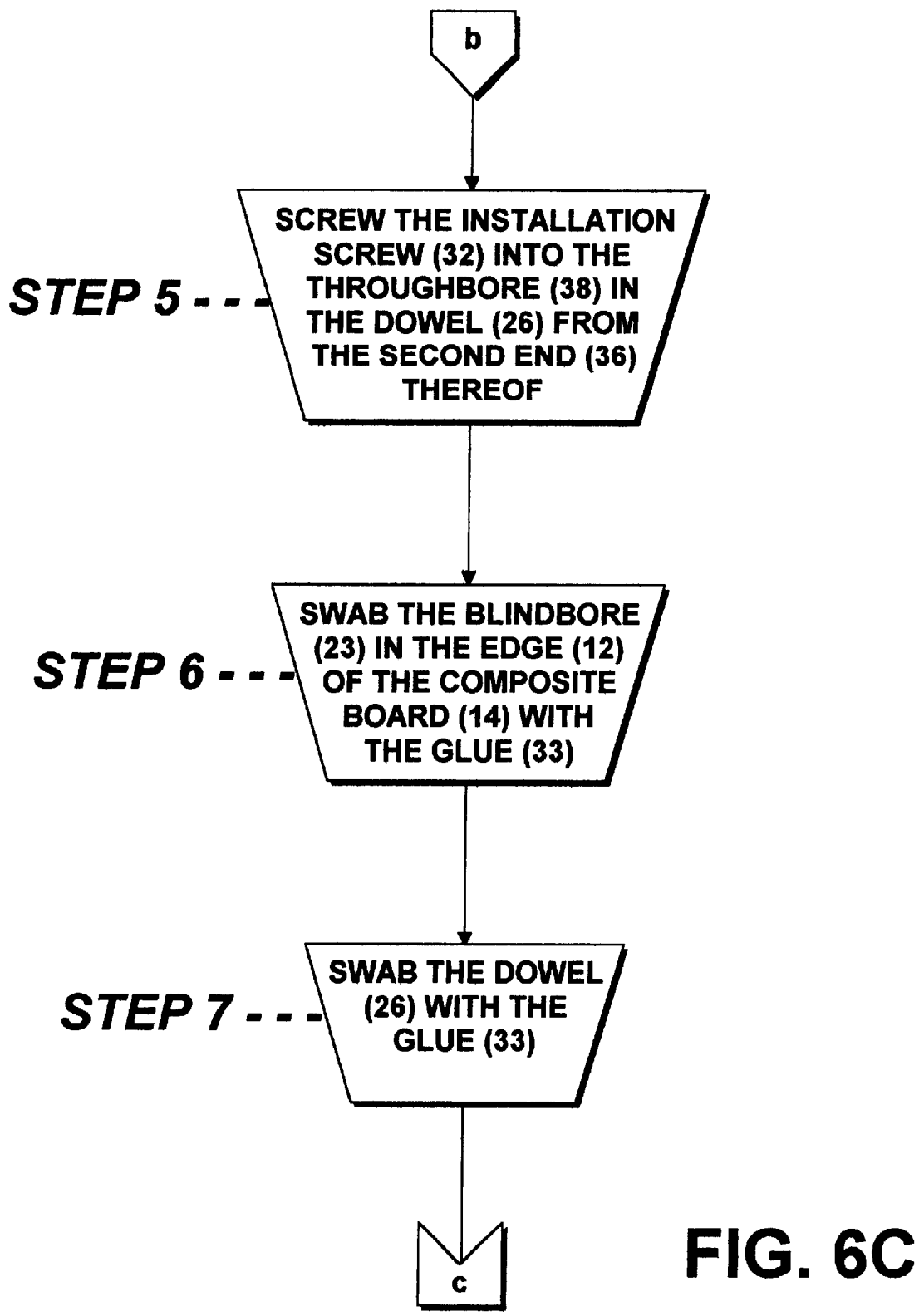
Figure 6D:
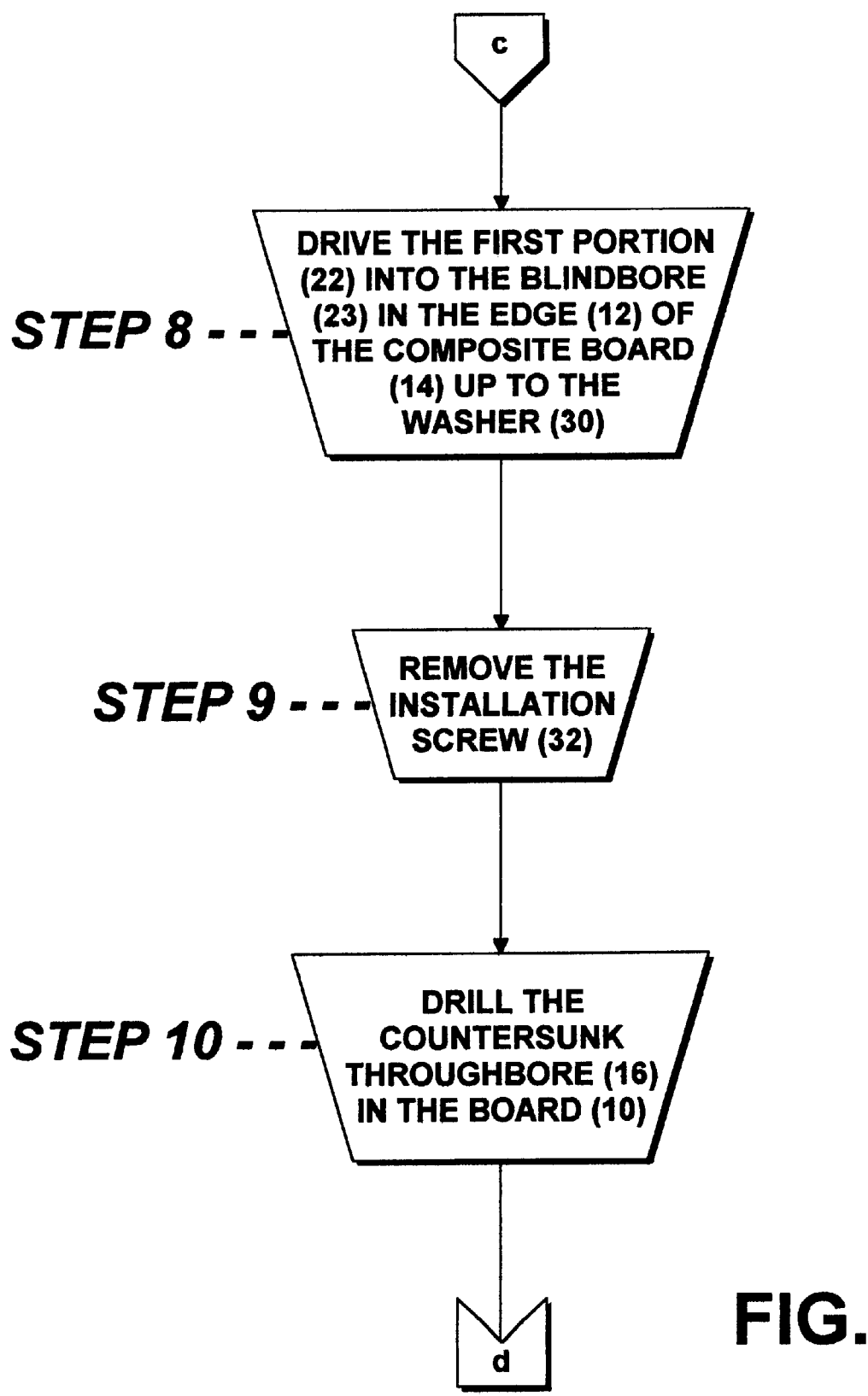
Figure 6E:
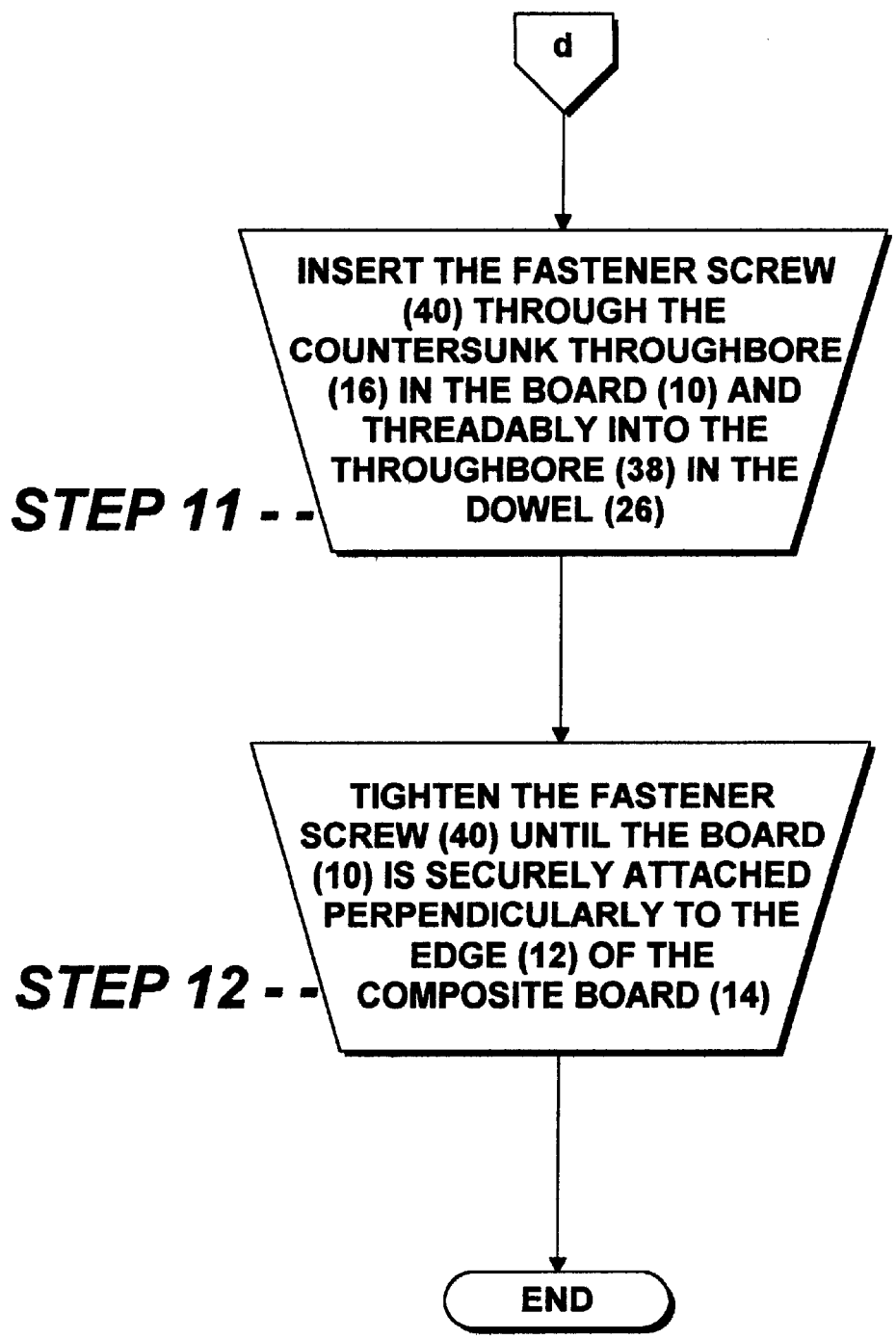

The configuration of the fastener 20 can best be seen in FIGS. 3 and 4, and as such, will be discussed with reference thereto.

The fastener 20 comprises a first portion 22 for engaging in a blindbore 23 in the edge 12 of the composite board 12.

The fastener 20 further comprises a second portion 24 that engages the first portion 22 for extending in the countersunk-throughbore 18 in the board 10.

The first portion 22 comprises a dowel 26 for fixedly engaging in the blind bore 23 in the edge 12 of the composite board 12.

The dowel 26 is metal, preferably aluminum 6061 T6.

The blind bore 23 centrally in the edge 12 of the composite board 14 has a diameter that is one of that of the dowel 26 and 2–5 thousands of an inch larger than that of the dowel 26 for preventing a tight press fit of the dowel 26 in the blind bore 23 centrally in the edge 12 of the composite board 14 which would weaken attachment.

The first portion 22 further comprises a washer 30 that removably abuts against the dowel 26 for removably abutting against the edge 12 of the composite board 12 for limiting travel of the dowel 26 in the blindbore 23 in the edge 12 of the composite board 14.

The first portion further comprises glue 33 that is disposed on the dowel 26 and in the blindbore 23 in the edge 12 of the composite board 14 for fixedly engaging the dowel 26 in the blindbore 23 in the edge 12 of the composite board 14.

The first portion 22 further comprises an installation screw 32 that extends through the washer 30 and threadably into the dowel 26, and when tightened, holds the first portion 22 together as a unit, while the unit is being installed in the blindbore 23 in the edge 12 of the composite board 14, and once the unit is installed, the installation screw 32 and the washer 30 are removed, with the glue 33 maintaining the first portion 22 in the blindbore 23 in the edge 12 of the composite board 14.

The dowel 26 is cylindrically-shaped and has a first end 34 that is closed for fixedly engaging in the blindbore 23 in the edge 12 of the composite board 14, a second end 36 that is open for fixedly aligning with the edge 12 of the composite board 12, an outer longitudinal surface 37 for fixedly engaging the blindbore 23, and a blindbore 38 that extends longitudinally centrally from the second end 36 thereof to short of the first end 34 thereof.

The outer longitudinal surface 37 of the dowel 26 is etched with 50% HCl to give a thin black coating to improve pullout strength of the dowel 26, as opposed to at least one of knurls, truncated threads, and roughening which would decrease the pullout strength of the dowel 26.

The washer 30 removably abuts against the second end 36 of the dowel 26.

The glue 33 is disposed on the outer longitudinal surface 37 of the dowel 26, in its entirety.

The second portion 24 comprises a fastener screw 40 that replaces the removed installation screw 32 and extends through the countersunk-throughbore 18 in the board 10 and into the throughbore 38 in the dowel 26, and when tightened, securely attaches the board 10 perpendicularly to the edge 12 of the composite board 14.

The method of utilizing the fastener 20 to attach the board 10 perpendicularly to the edge 12 of the composite board 14 can best be seen in FIGS. 5 and 6A–6E, and as such, will be discussed with reference thereto.

STEP 1: Drill the blind bore 23 centrally in the edge 12 of the composite board 14 with a drill bushing jig.
STEP 2: Drill the throughbore 38 longitudinally centrally into the dowel 26.
STEP 3: Etch the outer longitudinal surface 33 of the dowel 26.
STEP 4: Insert the installation screw 32 in the washer 30.
STEP 5: Screw the installation screw 32 into the throughbore 38 in the dowel 26 from the second end 36 thereof.
STEP 6: Swab the blindbore 23 in the edge 12 of the composite board 14 with the glue 33.
STEP 7: Swab the dowel 26 with the glue 33.
STEP 8: Drive the first portion 22 into the blindbore 23 in the edge 12 of the composite board 14 up to the washer 30.
STEP 9: Remove the installation screw 32.
STEP 10: Drill the countersunk-throughbore 16 in the board 10.
STEP 11: Insert the fastener screw 40 through the countersunk-throughbore 16 in the board 10 and threadably into the throughbore 38 in the dowel 26.
STEP 12: Tighten the fastener screw 40 until the board 10 is securely attached perpendicularly to the edge 12 of the composite board 14.

EXAMPLE I

A board was attached perpendicularly to an edge of a composite board with one fastener 20. The fastener 20 took a shear load of at least 162 lbs. before failure. Loading was increased in increments of about 10 lbs. to 150 lbs. and then in 2 lbs. increments until failure. The load was applied 1" back from the edge for the worst case scenario.

EXAMPLE II

A board was attached perpendicularly to an edge of a composite is board with more than one fastener 20. The joint was subjected to a shear load of 175 lbs. with no indication of failure during a test period of at least three days.

EXAMPLE III

A board was attached perpendicularly to an edge of a composite board with more than one fastener 20. The joint was subjected to a tensile pull until the head of the screw pulled out of the board, with no indication of pull out from the composite board.

EXAMPLE IV

A series of associated tests were made with metal dowel tubes inserted centrally in the end-surface of ¾ inch particle board samples. The dowels were ⅜ inch in diameter and 1 and ⅛ inches in length. 10–32 brass machine screws were used for attachment to the dowels. Strength in tension are given in the table infra, wherein H is the holding surface and F is the force to failure in pounds.

TABLE

| TEST NUMBER | DOWEL MATERIAL | SURFACE | H | F | REMARKS |
|---|---|---|---|---|---|
| 1 | wood | screw | | 195 | ⅛" × ¾" pilot hole, m.d. |
| 2 | wood | | 686 | 785 | 3/16" hole to end nut |
| 3 | wood | | 585 | 683 | same, but in ¾" plywood |
| 4 | aluminum | knurled | | 589 | o.d increased to .387" by knurling |
| 5 | aluminum | truncated third | 666 | 667 | |
| 6 | same | etched 50% HCL | 824 | 863 | |
| 7 | same | same | 785 | 824 | |
| 8 | aluminum | crs. emeried | 589 | 589 | |
| 9 | aluminum | rasp filed | | 400 | |
| 10 | aluminum | mill etched 50% HCL | 981 | 1079 | 3 day glue set |
| 11 | same | same | 981 | 1079 | 1 day glue set |
| 12 | same | same | 963 | 963 | 2 day glue set |

CONCLUSIONS

1) A wood screw attachment, even with the help of glue, has very poor strength compared to the use of any dowel.
2) A wood dowel has good strength and about the same in either particle board or plywood.
3) An aluminum metal dowel, without any specific surface treatment, has about the same strength as a wood dowel.

4) If the surface of the metal dowel, however, is etched with 50% hydrochloric acid, it has outstanding strength; it is 42% stronger than a wood dowel in pullout.
5) One day after a dowel is glued in, the pullout out strength is a maximum.

It will be understood that each of the elements described above, or two or more together, may also find a useful application in other types of constructions differing from the types described above.

While the invention has been illustrated and described as embodied in a fastener for securely attaching a board perpendicularly to an edge of a composite board, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A fastener for securely attaching a board perpendicularly to an edge of a composite board, said fastener comprising;
   a) a first portion for engaging in a blindbore in the edge of the composite board; and
   b) a Second portion engaging said first portion for extending in a countersunk-throughbore in the board;
   wherein said first portion comprises a dowel for fixedly engaging in the blind bore in the edge of the composite board;
   wherein said dowel is aluminum 6061 T6;
   wherein said dowel has a diameter that is adapted to be equal to the blindbore centrally in the edge of the composite board;
   wherein said first portion further comprises a washer that removably abuts against said dowel for removably abutting against the edge of the composite board for limiting travel of said dowel in the blindbore in the edge of the composite board;
   wherein said first portion further comprises glue that is disposed on said dowel and is for disposing in the blindbore in the edge of the composite board so as to fixedly engage said dowel in the blindbore in the edge of the composite board;
   wherein said first portion further comprises an installation screw that extends through said washer and threadably into said dowel, and when tightened, holds said first portion together as a unit, for installation into the blindbore in the edge of the composite board, and once said unit is installed, said glue maintaining said first portion in the blindbore in the edge of the composite board;
   wherein said dowel is cylindrically-shaped, and has:
      i) a first end that is closed for fixedly engaging in the blindbore in the edge of the composite board;
      ii) a second end that is open for fixedly aligning with the edge of the composite board;
      iii) an outer longitudinal surface for fixedly engaging the blindbore in the edge of the composite board; and
      iv) a blindbore that extends longitudinally centrally from said second end of said dowel to short of said first end of said dowel; and
   wherein said outer longitudinal surface of said dowel is etched with 50% HCl solution to give a thin black coating to improve pullout strength of said dowel, as opposed to at least one of knurls, truncated threads, and roughening which would decrease said pullout strength of said dowel.

2. The fastener as defined in claim 1, wherein said glue is disposed on said outer longitudinal surface of said dowel, in its entirety.

* * * * *